April 17, 1956     K. F. DOUGLAS     2,741,934
AUTOMATIC VARIABLE SPEED GEARING AND HUB
BRAKE FOR VELOCIPEDES AND THE LIKE Filed Feb. 28, 1955     2 Sheets-Sheet 1

INVENTOR.
Kenneth F. Douglas
BY
Clinton S. Janes
ATTORNEY

WITNESS:
Esther M. Stockton

April 17, 1956     K. F. DOUGLAS     2,741,934
AUTOMATIC VARIABLE SPEED GEARING AND HUB
BRAKE FOR VELOCIPEDES AND THE LIKE
Filed Feb. 28, 1955     2 Sheets-Sheet 2

WITNESS:
Esther M. Stockton

INVENTOR.
Kenneth F. Douglas
BY
Clinton L. Janes
ATTORNEY

United States Patent Office 2,741,934
Patented Apr. 17, 1956

2,741,934

AUTOMATIC VARIABLE SPEED GEARING AND HUB BRAKE FOR VELOCIPEDES AND THE LIKE

Kenneth F. Douglas, Elmira, N. Y., assignor to Bendix Aviation Corporation, Elmira Heights, N. Y., a corporation of Delaware Application February 28, 1955, Serial No. 490,939

5 Claims. (Cl. 74—751)

The present invention relates to an automatic variable speed gearing and hub brake for velocipedes and the like, and more particularly to a two speed gear in which the shift down from high gear to low gear is accomplished when a predetermined maximum load is placed on the transmission, and the shift back to high gear is brought about by relief of the driving effort, or by coasting.

In the automatic variable speed coaster brake of this type disclosed in the application of Hood Ser. No. 453,519, filed September 1, 1954, means are provided for adjusting the transmission to vary the maximum load at which the shift down to low gear takes place, in order to adapt the device for various operators. The present disclosure involves a similar form of transmission incorporating external adjustment means with visible calibration.

It is an object of the present invention to provide a novel device of this character which is simple in construction and efficient and reliable in operation.

It is another object to provide such a device in which the adjustment of the transmission is secured by means of a telescoping action of the wheel hub.

It is another object to provide such a device in which the adjustment of the hub bearings is automatically maintained during the external adjustment of the transmission.

Further objects and advantages will be apparent from the following description taken in connection with the accompanying drawings in which.

Figure 1:
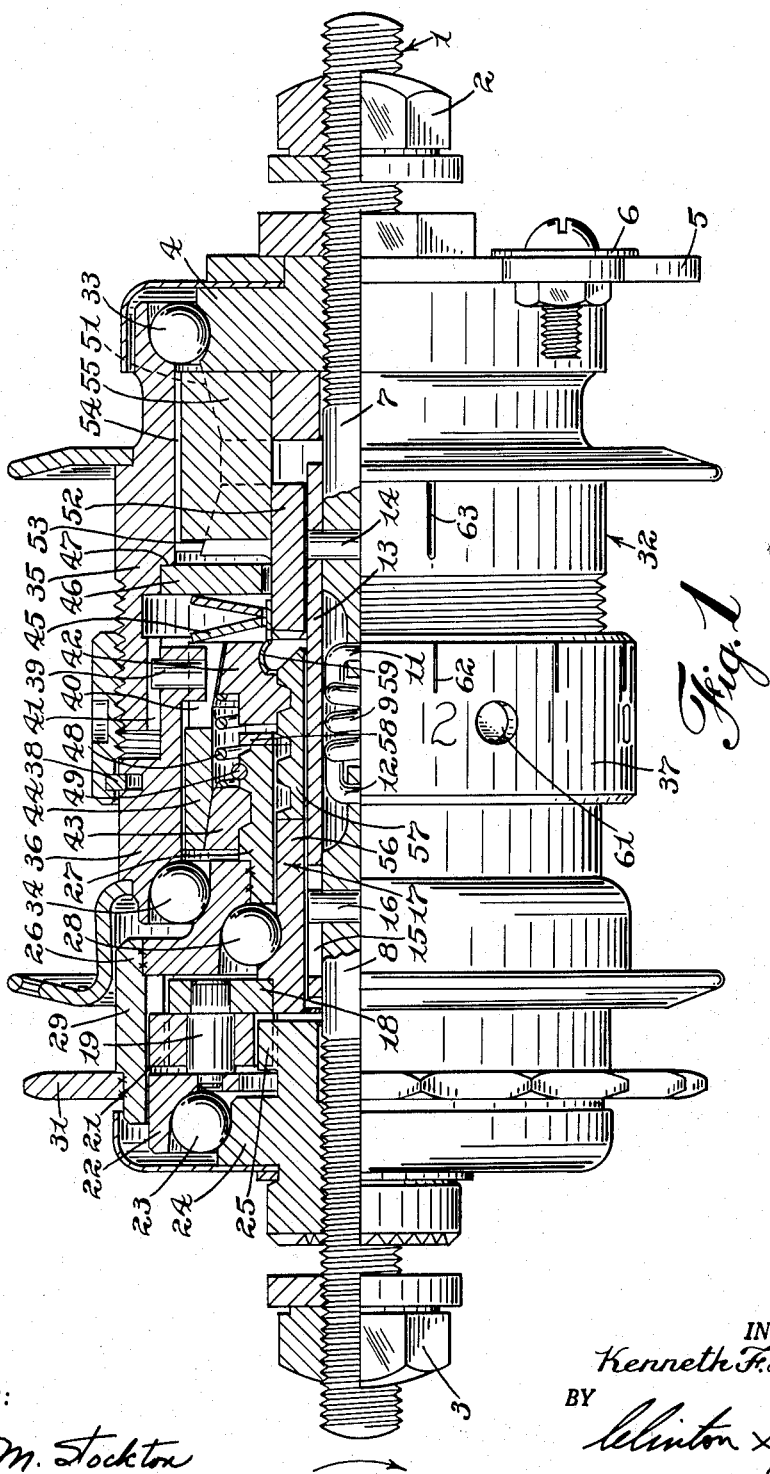
Fig. 1 is a side elevation, partly broken away and in section, of a preferred embodiment of the invention, showing the parts in high gear driving relation.
Figure 2:
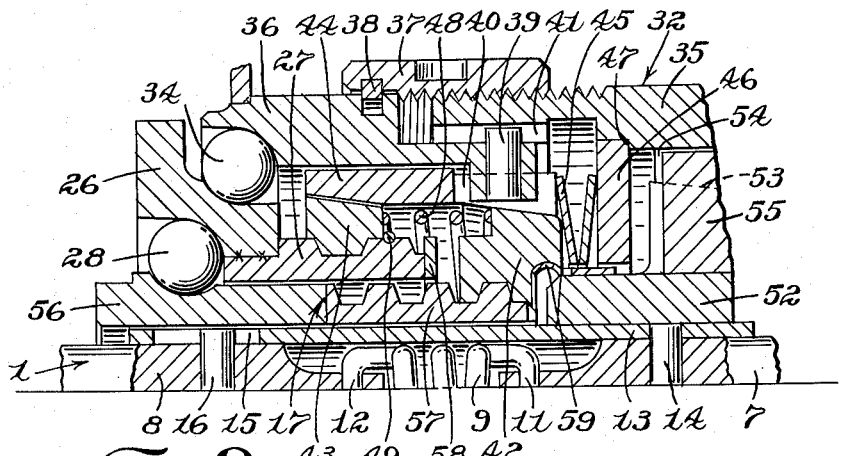
Fig. 2 is an enlarged detail showing the parts of the transmission in low gear driving relation.

In Fig. 1 of the drawing there is illustrated an axle 1 which is arranged to be clamped in the forks of a vehicle such as a bicycle, not illustrated, by means of clamp nuts 2 and 3. An anchor member 4 is mounted on the axle 1 and prevented from rotation by means of a brake arm 5 non-rotatably mounted thereon and having a clip 6 for suitable atachment to the frame of the bicycle.

The axle 1 comprises two coaxially arranged sections 7, 8 which are drawn toward each other by a spring 9 which is anchored by its ends as indicated at 11, 12 to the adjacent ends of the axle sections. A sleeve 13 is fixedly mounted on the axle section 7 by means of a pin 14, and extends in telescoping relation to the axle section 8 where it is provided with a slot 15 slidably receiving a pin 16 suitably fixed in the axle section 8 whereby the axle section is maintained in alinement and prevented from relative rotation.

A low speed screw shaft 17 is journalled on the sleeve 13 and has fixedly mounted thereon a planet carrier 18 having fixed therein a plurality of bearing pins 19 on which planet pinions 21 are rotatably mounted. The outer ends of the bearing pins 19 are received in a race member 22 which is rotatably mounted by means of ball bearings 23 on a bearing member 24 adjustably fixed on the axle section 8. Bearing member 24 has formed thereon a sun gear 25 which is in constant mesh with the planet pinions 21.

A high speed driving member 26 including a screw shaft 27 is rotatably mounted on the low speed screw shaft 17 by means of bearings 28. Driving member 26 further comprises an orbit gear 29 meshing with the planet pinions 21, and a driving sprocket 31 fixed thereon, the parts being united in any suitable manner as by brazing as indicated.

A hub member indicated generally by numeral 32 is journalled at its ends on the anchor member 4 and the high speed driving member 26 by means of bearings 33 and 34 respectively. The hub member is formed of two telescoping sections 35 and 36 which are adjustably connected by means of a coupling sleeve 37 threaded on the hub section 35, and swiveled as indicated at 38 on the hub section 36. Relative rotation of the hub sections is prevented by a pin 39 fixedly mounted in the section 36 and slidably received in a longitudinal groove 41 in the hub section 35.

A low speed driving clutch member 42 is threaded on the low speed screw shaft 17, a high speed driving clutch member 43 is threaded on the high speed screw shaft 27, and a driven clutch member 44 is splined as indicated at 40 within the hub section 36 and provided with internal conical clutch surfaces arranged to be engaged by said two driving clutch members. Means for yieldably resisting longitudinal movement of the driven clutch member by the driving clutch members is provided in the form of a plurality of dished spring members 45 interposed between the end of the driven clutch member and an annular thrust plate 46 which bears against a shoulder 47 in the hub section 35.

A light compression spring 48 is interposed between the high speed and low speed driving clutch members, and a stop ring 49 is seated in the high speed screw shaft 27 in position to limit the engaging movement of the high speed driving clutch member 43.

The anchor member 4 is provided with a conical surface 51, and a movable expander member 52 is slidably mounted on the sleeve 13 and formed with a conical surface 53. A plurality of brake shoes 54 are seated on the conical surfaces 51, 53 and are prevented from rotation by rectangular keys 55 slidably received in alined slots formed in the anchor member 4 and expander 52 whereby movement of the expander 52 to the right causes the brake shoes 54 to frictionally engage the interior of the hub section 35.

Figure 3:
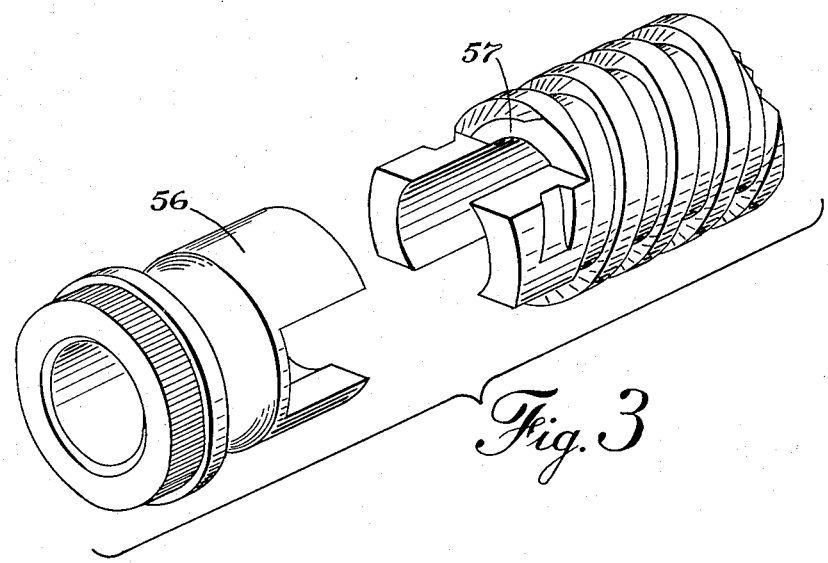
Fig. 3 is a detail in perspective of the low speed driving screw shaft.

In order to actuate the expander member 52, the low speed screw shaft 17 is formed in two parts 56, 57 which are splined together as best shown in Fig. 3 whereby backward rotation of said screw shaft will cause the section 57 to move to the right by screw-jack action with the low speed driving clutch member 42, the longitudinal movement of which to the left is limited by a thrust washer 58 which bears against the adjacent end of the high speed screw shaft 27.

Translation of the low speed driving clutch member 42 on rotation of the low speed screw shaft is preferably assured by means of a frictional drag member 59 carried internally by said clutch member and having a split skirt bearing frictionally on expander member 52.

In operation, forward rotation of the driving member 29 in the direction of the arrow by means of sprocket 31 will be transmitted to the high speed screw shaft 27, causing the high speed driving clutch member 43 to engage and drive the driven clutch member 44, and consequently rotate the hub 32 by means of its splined connection 40. The screw-jack action of the clutch member 43 on the screw shaft 27 tends to move the driven clutch member 44 to the right, which movement is resisted yieldingly by the spring 45.

At this time, the low speed screw shaft 17 is also rotated forwardly, but since its speed of rotation by means of the planetary gearing is less than that of the high speed clutch members, the frictional drag of the spring 43 will cause the low speed driving clutch member 42 to overrun its screw shaft and disengage itself from the driven clutch member 44.

When the driving load is increased beyond a predetermined maximum, the longitudinal pressure of the high speed driving clutch member 43 moves the driven clutch member 44 to the right, compressing the spring 45 until such movement is arrested by the stop ring 49. Slippage of the high speed driving clutch member 43 will then take place, permitting acceleration of the low speed driving screw shaft 17 sufficiently to cause engagement of the low speed driving clutch member 42 which then becomes effective to rotate the hub 32, at the same time further compressing the clutch spring 45 so as to move the driven clutch member 44 out of engagement with the driving clutch member 43.

In order to adjust the predetermined maximum force at which the shift to low gear takes place it is merely necessary to adjust the coupling sleeve 37 of the hub by means of a spanner or other suitable tool engaging openings 61 formed in the sleeve for that purpose. Preferably scale 62 is provided on the sleeve 37, and an index mark 63 on the hub section 35 whereby any desired setting of the clutch may be secured and recorded.

The spring 9 which draws the sections 7 and 8 of the axle together is preferably made stiffer and stronger than the clutch controlling spring 45. Consequently, when the sleeve 37 is rotated to vary the setting of the high-speed clutch, the adjustment of the various bearings of the hub is maintained by appropriate contraction or expansion of the axle spring 9.

When it is desired to shift back to high gear, it is merely necessary to stop the rotation of the driving member 29 for an instant, upon which the overrunning of the hub 32 will cause the low speed driving clutch member 42 to be threaded to the left, permitting the driven clutch member 44 to reengage with the high speed driving clutch member 43.

Application of the brake is brought about by backward rotation of the driving member 29 which causes backward rotation of the low speed screw shaft 17 whereby the splined section 57 thereof is moved to the right to engage the expander member 52 and cause it to actuate the brake shoes 54.

Although but one embodiment of the invention has been shown and described in detail it will be understood that changes may be made in the design and arrangement of the parts without departing from the spirit of the invention.

I claim:

1. In a two-speed transmission for velocipedes or the like, a fixed axle, a low-speed screw shaft journalled thereon, a driving member and high speed screw shaft rotatably mounted on the low-speed shaft, a gear reduction drive from the driving member to the low-speed screw shaft, a stationary bearing member on the axle, a hub comprising two telescoping sections rotatably mounted on the driving member and the bearing member respectively, a high-speed driving clutch member threaded for limited longitudinal movement on the high speed screw shaft, a low-speed driving clutch member similarly threaded on the low-speed screw shaft, a driven clutch sleeve splined in one section of the hub having separated surfaces cooperating respectively with the driving clutch members, the other section of the hub having an internal shoulder, a thrust collar bearing on said shoulder, a compression clutch spring seated against the thrust collar and urging the driven clutch member into engagement with the driving clutch members, and means for adjusting the telescopic relation of the sections of the hub.

2. A device as set forth in claim 1 in which the sections of the hub are non-rotatably connected together, and the adjusting means comprises a collar swivelled to one section and threaded on the other.

3. A device as set forth in claim 2 including further means for rotating the adjusting collar and for indicating the adjustment thereof in terms of the setting of the high speed clutch by compression of the clutch spring.

4. A device as set forth in claim 1 in which the axle is made in two parts with a sleeve telescoped over the adjacent ends, said fixed bearing member being mounted on one of said parts of the axle; and including further a bearing for the driving member and high speed screw shaft adjustably mounted on the other part of the axle, and a tension spring drawing the parts of the axle together.

5. A device as set forth in claim 4 in which the tension spring is stiffer than the compression spring for the clutches.

References Cited in the file of this patent

UNITED STATES PATENTS

| | | |
|---|---|---|
| 942,520 | Rockwell | Dec. 7, 1909 |
| 2,208,073 | Hatton | July 16, 1940 |
| 2,600,586 | Spencer | June 17, 1952 |